US011173080B2

(12) United States Patent
Raja et al.

(10) Patent No.: US 11,173,080 B2
(45) Date of Patent: Nov. 16, 2021

(54) MOBILE OBJECT

(71) Applicant: SUZUKI MOTOR CORPORATION, Hamamatsu (JP)

(72) Inventors: Gopinath Raja, Hamamatsu (JP); Masayoshi Wada, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 294 days.

(21) Appl. No.: 16/593,540

(22) Filed: Oct. 4, 2019

(65) Prior Publication Data
US 2020/0315881 A1 Oct. 8, 2020

(30) Foreign Application Priority Data

Apr. 5, 2019 (JP) .............................. JP2019-072868

(51) Int. Cl.
A61G 5/08 (2006.01)
A61G 5/00 (2006.01)
B60B 19/04 (2006.01)

(52) U.S. Cl.
CPC ............ A61G 5/0833 (2016.11); A61G 5/003 (2013.01); B60B 19/04 (2013.01); B60Y 2200/84 (2013.01)

(58) Field of Classification Search
CPC ............... A61G 5/0833; A61G 5/0816; B60B 35/1045; B60B 19/04
See application file for complete search history.

(56) References Cited

U.S. PATENT DOCUMENTS 4,834,409 A * 5/1989 Kramer ............... B60B 35/1045
180/209
5,605,345 A * 2/1997 Erfurth ..................... A61G 5/08
135/67
(Continued)

FOREIGN PATENT DOCUMENTS

DE 19933052 C1 * 11/2000 ............... B60G 3/00
DE 202012102516 U1 * 8/2012 ............. B62K 3/002
(Continued)

OTHER PUBLICATIONS

Suzuki exhibits the concept model "kupo" at "2020, Shibuya. Let's experience the daily life of super welfare", Development of a walking assistance vehicle with the function of an electric wheelchair. URL: https://www.Suzuki.co.jp/release/c/2018/1102/, Nov. 2, 2018, Publisher: Suzuki Motor Corporation.

Primary Examiner — Steve Clemmons
(74) Attorney, Agent, or Firm — Cozen O'Connor

(57) ABSTRACT

A mobile object is configured so as to be capable of moving front and rear bases 10,30 object to each other in order to make a wheel base provided between the front wheels 12 and the rear wheels 32 expandable and contractible. The front base 10 moves so as to be expand and contract the tread width between the front wheels 12 in association with the expansion and the contraction of the wheel base achieved. The seating part 41 is configured so as to turn forward in association with the relative movement of the front and rear bases 10,30 in order to contract the wheel base and the tread width. The seating part 41 is configured so as to turn backward in association with the relative movement of the front and rear bases 10,30 in order to expand the wheel base and the tread width.

4 Claims, 6 Drawing Sheets

(56) References Cited

U.S. PATENT DOCUMENTS

| | | | | |
|---|---|---|---|---|
| 5,944,338 | A * | 8/1999 | Simpson | A61G 5/006 |
| | | | | 280/650 |
| 6,340,168 | B1 * | 1/2002 | Woleen | A61G 5/08 |
| | | | | 135/66 |
| 9,211,000 | B1 * | 12/2015 | Storkel | A61H 3/04 |
| 9,265,675 | B2 * | 2/2016 | Ransenberg | B62K 5/025 |
| 9,333,986 | B2 * | 5/2016 | Kim | A61G 5/08 |
| 9,339,431 | B2 * | 5/2016 | Menard | A61H 3/04 |
| 2009/0315300 | A1 * | 12/2009 | Stiba | B62B 9/28 |
| | | | | 280/648 |
| 2010/0084831 | A1 * | 4/2010 | Wang | B60N 2/3065 |
| | | | | 280/39 |
| 2015/0217792 | A1 * | 8/2015 | Stiba | B62B 9/20 |
| | | | | 280/650 |
| 2020/0008990 | A1 * | 1/2020 | Harrison | B62K 13/06 |

FOREIGN PATENT DOCUMENTS

| | | | | |
|---|---|---|---|---|
| GB | 2559786 A * | 8/2018 | | A61G 5/04 |
| JP | H 10-248879 | 9/1998 | | |
| JP | 2000-005239 | 1/2000 | | |
| JP | 2001-048497 | 2/2001 | | |
| JP | 2005-328914 | 12/2005 | | |
| JP | 2006-103512 | 4/2006 | | |
| JP | 2009-183407 | 8/2009 | | |
| JP | 2016-168153 | 9/2016 | | |
| WO | WO-2015053677 A1 * | 4/2015 | | B62K 5/025 |

\* cited by examiner

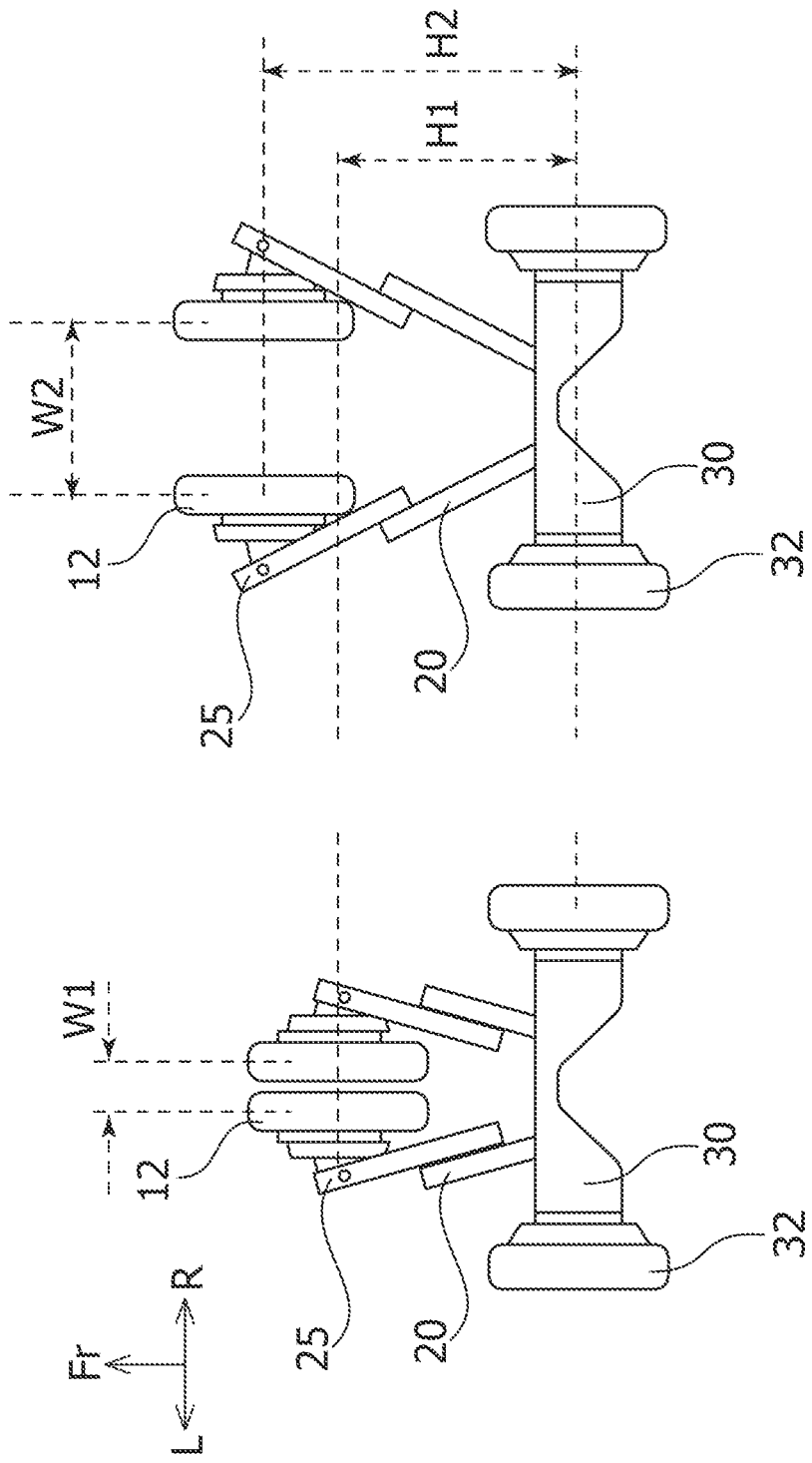

MOBILE OBJECT

FIELD OF THE INVENTION

The present invention relates to a mobile object.

BACKGROUND OF THE INVENTION

In related art, mobile objects such as wheelchairs and carts are used as moving means for users such as the elderly and persons needing care. Typically, the mobile object includes a moving base having front wheels and rear wheels and a seat to be mounted on the moving base, so that the user is capable of moving in a state of being seated on the seat. As mobile objects, electric vehicles such as electric wheelchairs and electric carts which are capable of self-traveling by means of driving means such as a motor are widely used. The electric vehicle is also referred to as a "senior car".

Known examples of the mobile object driven by an electric motor include an electric vehicle as disclosed in JP 2016-168153 A. The electric vehicle of this example includes a riding mode for traveling with a person riding thereon and a cart mode to be used by a person for carrying objects. The electric vehicle is configured so as to move the position of a basket for storing objects obliquely upward toward a handle when changing from the riding mode to the cart mode. This makes the cart mode easy to use.

In the mobile object having two modes, that is, the cart mode and the riding mode, as described above, a smaller width of the mobile object (the width in the left-right direction when the user of the mobile object faces the direction of movement of the mobile object) is preferred because the mobile object is required to be operable in a zippy manner in the cart mode. In contrast, in the riding mode, stability is required, and thus, a larger width of the mobile object is preferred. However, these requirements conflict.

Therefore, in the mobile objects as in the example given above, stability may be reduced in the riding mode when the vehicle body is designed in conformity with the cart mode, and the operability in a zippy manner may be lowered when the vehicle body is designed in conformity with the riding mode. Therefore, regarding the mobile objects having two modes, the example given above still has room for improvement in achieving two performances required for the two modes.

In view of such a problem, it is an object of the invention is to provide a mobile object capable of achieving performances required for two modes, that is, a riding mode and a cart mode.

In order to achieve the object described above, a mobile object according to an aspect of the invention includes: a mobile object base including a front base having front wheels disposed at a distance in a width direction and a rear base being located rearward with respect to the front base and including rear wheels; a seat including a seating part having a seating surface and a leg part configured so as to rotatably support the seating part, and being located above the moving base. The mobile object includes a movable mechanism configured so as to be capable of moving the front base and the rear base relative to each other in order to make a wheel base provided between the front wheels and the rear wheels extensible and contractable. The front base is configured so as to be changeable so as to be capable of expanding and contracting a tread width between the front wheels in association with expansion and contraction of the wheel base caused by the movable mechanism. The seating part is configured so as to turn forward until the seating surface faces forward via the leg parts in association with the relative movement of the front base and the rear base in order to contract the wheel base and the tread width. The seating part is configured so as to turn rearward until the seating surface faces upward via the leg parts in association with the relative movement of the front base and the rear base in order to expand the wheel base and the tread width.

According to the invention, performances required for the two modes, that is, the riding mode and the cart mode, are simultaneously achieved.

BRIEF DESCRIPTION OF THE DRAWINGS

FIG. 6A is a plan view illustrating a modified example of the moving base in FIG. 4 in the contracted state; and FIG. 6B is a plan view illustrating a modified example of the moving base in FIG. 4 in the expanded state.

DETAILED DESCRIPTION OF THE INVENTION

Figure 1:
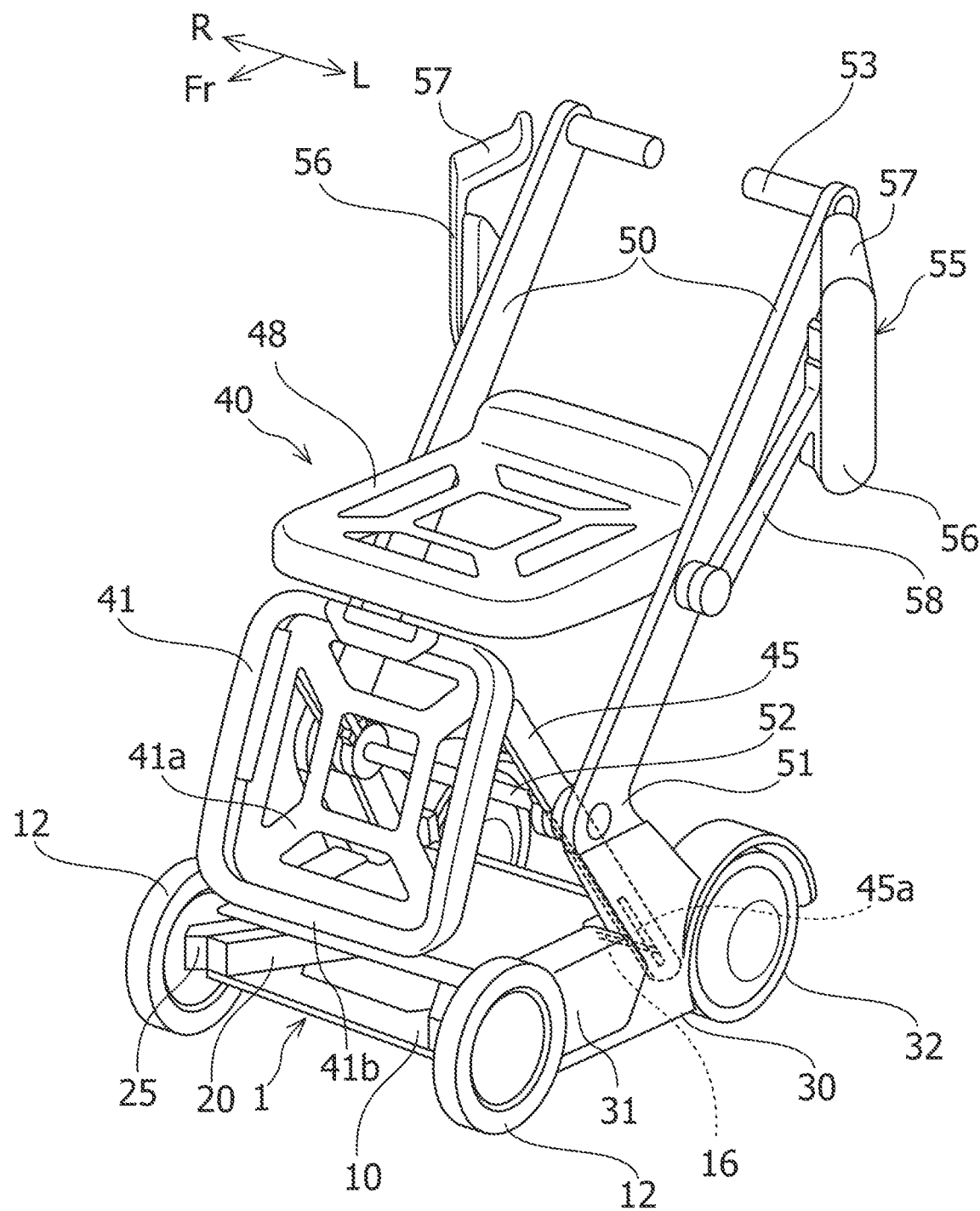
FIG. 1 is a schematic perspective view illustrating an electric vehicle according to an embodiment of the mobile object according to the invention in an electric walking aid vehicle mode in a state in which a front base is located on a rear side and a tread width of front wheels is contracted.

In the present embodiment, an electric vehicle configured as a mobile object will be described below. In this specification, the mobile object may have a single seater, and in addition, the mobile object is configured so as to open the seat 40 provided thereon to the outside thereof. For example, the mobile object may be a wheelchair, a cart, and the like and especially, the mobile object may be single-seater wheelchair, a single-seater cart, and the like. However, the mobile object is not limited to these configurations.

The electric vehicle according to the present embodiment is configured so as to be capable of traveling by electromotive drive. In the present embodiment, the electric vehicle is an electric cart, and in particular, is a single-seater electric cart. However, the electric vehicle is not limited to this, and it may be a vehicle other than the electric cart. For example, the electric vehicle can be an electric wheelchair, and in particular, can be a single-seater electric wheelchair. Hereinafter, the electric vehicle is simply called a "vehicle", if necessary.

In the drawing, an arrow Fr indicates forward in a vehicle front-rear direction. A "front portion (front end) and rear portion (rear end)" in the description of embodiment corresponds to the front portion and the rear portion in the vehicle front-rear direction. The arrows R and L represents respectively the right side and the left side in a vehicle width direction. The "left and right" in the present embodiment correspond to the "left side" and the "right side" when a passenger faces the vehicle front.

The electric vehicle of the present embodiment will be schematically described. The electric vehicle includes two modes, that is, a single-seater compact electric vehicle mode (riding mode) illustrated in FIG. 2 and an electric walking aid vehicle mode (cart mode) for walking aid illustrated in FIG. 1.

Figure 2:
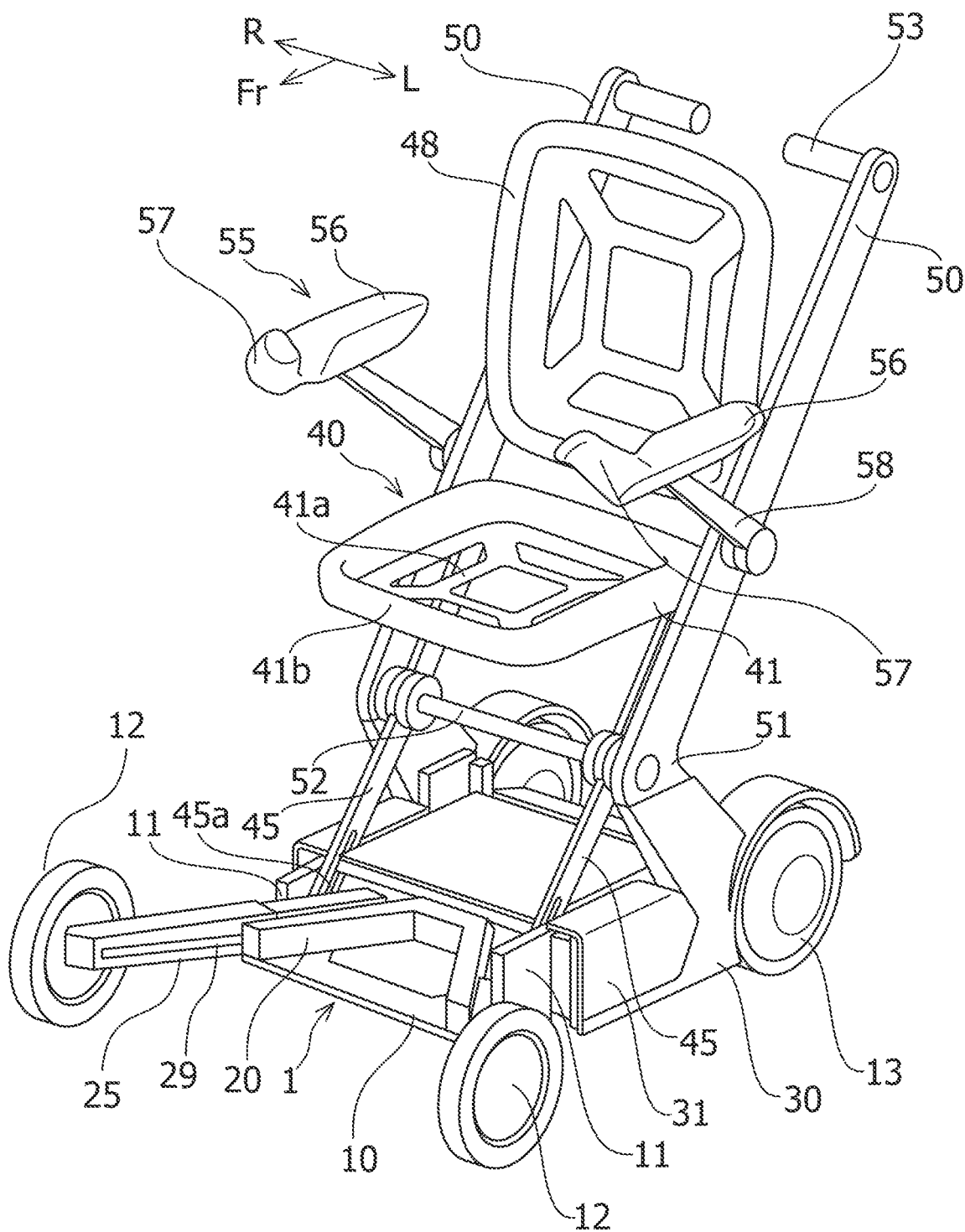
FIG. 2 is a perspective view illustrating a compact electric vehicle mode of the electric vehicle in FIG. 1 in a state in which the front base protrudes forward and the tread width of the front wheels is expanded.

As illustrated in FIG. 1 and FIG. 2, the electric vehicle includes a moving base 1 configured so as to be capable of traveling by electromotive drive. The moving base 1 includes two front wheels 12, and two rear wheels 32 which are located in the vehicle rear at a distance from the front wheels 12. The front wheels 12 and the rear wheels 32 serve as traveling wheels of the vehicle.

The electric vehicle also includes two posts 50 disposed at a distance from each other in the vehicle width direction. The posts 50 are members constituting a vehicle body frame of the electric vehicle and are disposed above the moving base 1. The posts 50 each have a bent portion 51 bending toward the vehicle rear when viewed in the vehicle width direction. An upper side of the bent portion 51 extends upward as it goes toward the vehicle rear. A lower side of the bent portion 51 extends downward as it goes toward the vehicle rear, and is joined to a posterior side member 31. The posts 50 each are provided at an upper end portion thereof with a push handle portion 53 held by a walker when in the electric walking aid vehicle mode.

The electric vehicle includes a single seat 40 located above the moving base 1. The seat 40 is attached to portions in the vicinity of the bent portions 51 of the posts 50. The seat 40 includes a seating part 41, a back plate 48, and two leg parts 45. The seating part 41 includes a seating surface 41a configured so as to allow the user to be seated. In particular, the seat 40 may have a single-seater configuration. However, the seat 40 of the vehicle is not limited thereto.

The bent portions 51 of the left and right posts 50 are coupled by a pivot shaft 52 extending in the vehicle width direction. The two leg parts 45 are elongated members. Middle parts of the leg parts 45 in the longitudinal direction are coupled to the pivot shaft 52 at the bent portions 51 of the posts 50 so as to be pivotable. Upper portions of the leg parts 45 are coupled to a rear portion of the seating part 41 when the electric vehicle is in the compact electric vehicle mode.

Lower portions of the leg parts 45 are coupled to the moving base 1. Although detailed illustration is omitted, the lower portion of each of the leg parts 45 is provided with a long hole 45a extending in the longitudinal direction of the leg part 45. The seating part 41 is configured so as to pivot by pivotal movements of the leg parts 45 about the pivot shaft 52. The pivotal movement of the seating part 41 will be described later.

The back plate 48 is located above the moving base 1. The back plate 48 is configured so as to be movable between a standing-up position and a lying-down position. Here, the back plate 48 assumes the standing-up position when the electric vehicle is in the compact electric vehicle mode as illustrated in FIG. 2, and assumes the lying-down position when in the electric walking aid vehicle mode as illustrated in FIG. 1.

As illustrated in FIG. 2, the back plate 48 is positioned in the vehicle rear and the vehicle upper side with respect to the seating surface 41a in the standing-up position. As illustrated in FIG. 1, the back plate 48 is positioned at the vehicle front in the lying-down position in contrast to the standing-up position. The back plate 48 in the lying-down position is located at the vehicle lower side and toward the center in the vehicle width direction of the vehicle with respect to the armrests 55 described later.

Here, the armrests 55 will be described. The armrests 55 are disposed on the upper side of the moving base 1 and on the outer sides in the vehicle width direction with respect to the seating surface 41a. The electric vehicle of this example includes two armrests 55. The two armrests 55 are disposed on both sides of the seating surface 41a in the vehicle width direction. Note that the electric vehicle may be configured so as to have a single armrest 55 on one of the outer sides.

The armrests 55 are positioned in the vehicle upper side with respect to the seating part 41. Supporting parts 58 of the two armrests 55 are attached respectively to the two posts 50 so as to be pivotable.

The armrests 55 are disposed on the upper side of the moving base 1. Each of the armrests 55 includes a supporting part 58 supported on the moving base 1 and a body part 56 supported by the supporting part 58. In addition, each of the armrests 55 further includes a grip 57 protruding from the body part 56.

The armrests 55 are configured so as to be changeable in position between the position of use and the lift-up position. The armrests are at the position of use in the compact electric vehicle mode and at the lift-up position in the electric walking aid vehicle mode. Specifically, as illustrated in FIG. 2, the armrests 55 at the position of use are disposed so as to allow the user seated on the seating surface 41a to hold the grips 57 with the arms of the user above the armrests 55. As illustrated in FIG. 1, the armrests 55 are disposed at the lift-up position so as to lift up the grips 57 to a position upward of the position of use. Referring to FIGS. 1 and 2, the grips 57 positioned at the lift-up position are located outward of the grips 57 at the position of use in the width direction of the vehicle.

The grip 57 on one of the two armrests 55 includes an operation part (not illustrated) configured so as to allow the vehicle to be operable. In particular, the operation part may be configured so as to allow the user to operate with one hand. The operation part may be a joystick. However, each of the grips 57 of the two armrests 55 may have the operation part. The operation part is not limited thereto, and may be a button, a touch-sensitive panel, a lever, a dial-type knob, and the like.

The moving base 1 according to the present embodiment is configured in detail as follows. As illustrated in FIGS. 1 to 3, the moving base 1 includes a front base 10 having the front wheels 12 and a rear base 30 having the rear wheels 32. The rear base 30 is disposed at the vehicle rear side with respect to the front base 10. Referring to FIGS. 1 and 2, the moving base 1 includes a movable mechanism configured to be capable of moving the front base 10 and the rear base 30 relative to each other in the vehicle front-rear direction. The movable mechanism makes the wheel base between the front wheels 12 and the rear wheels 32 extensible and contractible. The front base 10 is configured so as to be expand and contract the tread width between the left and right front wheels 12 in association with the expansion and the contraction of the wheel base achieved by the movable mechanism.

Structure or the like of the rear base 30 and the front base 10 will be described below. In addition, the rear base 30 includes two posterior side members 31 disposed at a distance from each other in the vehicle width direction. The two rear wheels 32 are attached respectively to the two posterior side members 31 at rear end portions in the vehicle front-rear direction so as to be rotatable about an axis of rotation extending in the vehicle width direction. Although not illustrated, a battery (not shown) for moving driving the rear wheels 32 and a control device (not shown) for controlling the direction of movement of the electric vehicle are disposed between the rear posterior side members 31. The control device is electrically connected to the operation part provided on the grip 57.

The front base 10 includes an anterior side member 11, a guide portion 20, inclined extensible portions (extensible portions) 25. The anterior side members 11 are disposed at a distance from each other in the vehicle width direction. Each of the anterior side members 11 is a substantially rectangular plate shape extending in the vehicle front-rear direction and having an outer surface facing outward in the vehicle width direction. The anterior side members 11 are disposed at a distance from each other inside the posterior side members 31 in the vehicle width direction, and are configured so as to be movable in the vehicle front-rear direction with respect to the posterior side members 31 by the movable mechanism. The leg parts 45 of the seat 40 are disposed between the anterior side members 11 and the posterior side members 31.

Although detailed description of the movable mechanism is omitted, for example, the anterior side members 11 may be configured to be movable with respect to the posterior side members 31 in the vehicle front-rear direction with such a configuration that rail portions (not shown) are provided on inner wall surfaces of the posterior side members 31, and slide portions are provided on outer wall surfaces of the anterior side members 11, and the rail portions are engaged with the slide portions.

The guide portion 20 is disposed between the left and right anterior side members 11. As illustrated in FIG. 2, the mid-section of the guide portion 20 extends linearly in the vehicle width direction, and widthwise side portions of the guide portion 20 extend obliquely outward in the vehicle width direction as it goes toward the vehicle front from both sides of the mid-section. In other words, the guide portion 20 is inclined so as to spread toward the front in such a manner that the distance between the both widthwise side portions increases in the vehicle width direction. Although detailed illustration is omitted, the guide portion 20 is configured so as to be movable in the vehicle front-rear direction with respect to the posterior side members 31 in the same manner as the anterior side members 11.

Although illustration is omitted, the moving base 1 includes a bottom plate to which the posterior side members 31 are joined. For example, such a configuration is also applicable in which rails extending in the vehicle front-rear direction are provided on the bottom plate so as to make the guide portion movable in parallel in the vehicle front-rear direction on the rails. Operations of the guide portion 20 and the anterior side members 11 will be described later.

Figure 3A:
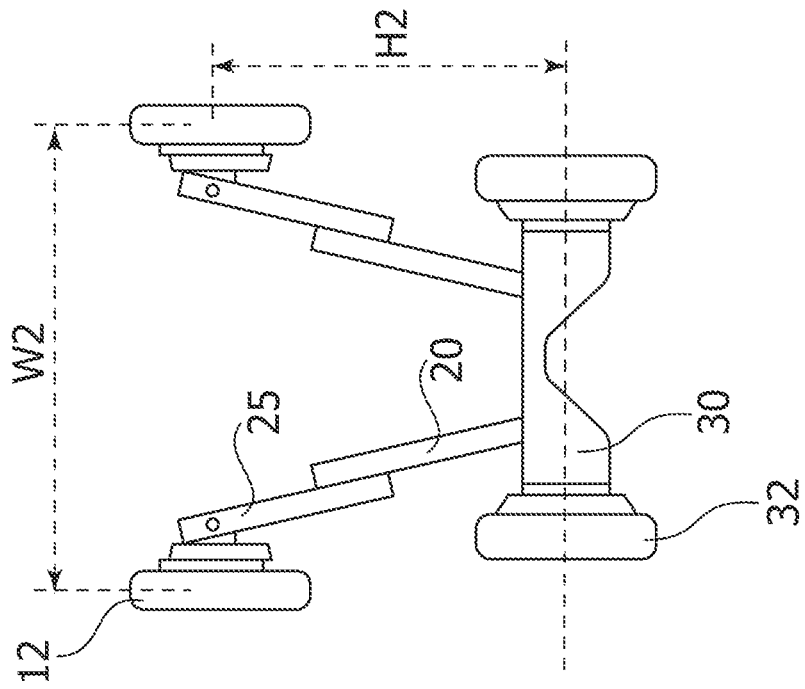
FIG. 3A is a schematic plan view illustrating a state in which the moving base in FIG. 1 is in the contracted state.
Figure 3B:
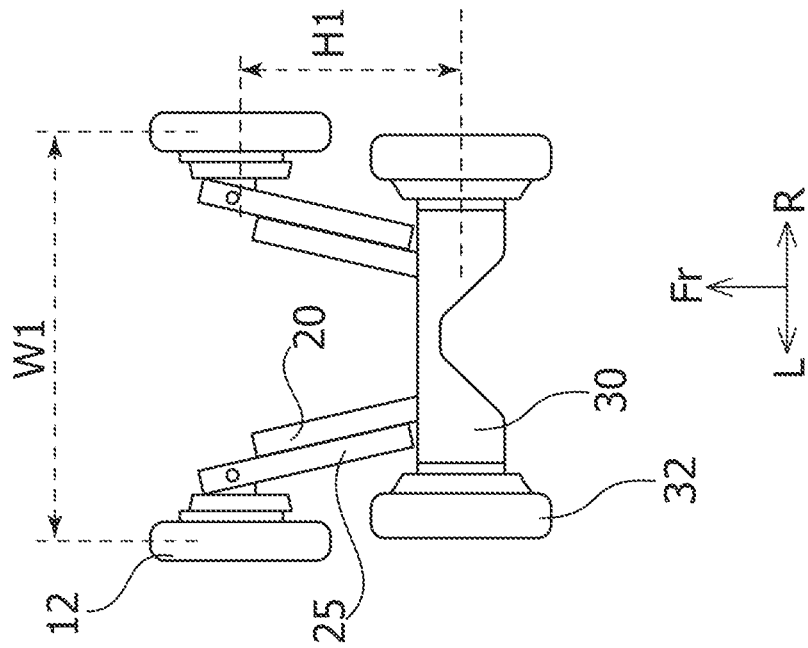
FIG. 3B is a schematic plan view illustrating a state in which the moving base in FIG. 1 is in the expanded state.

The inclined extensible portions 25 engage the widthwise side portions of the guide portion 20, and as illustrated in FIGS. 3A and 3B, extend in the direction of inclination. The inclined extensible portions 25 in this example have a substantially parallelepiped shape extending in the direction of inclination described above. The front wheels 12 are attached to outer front portions of the inclined extensible portions 25 so as to be rotatable about an axis extending in the vehicle width direction. The inner side surfaces of the inclined extensible portions 25 in the vehicle width direction are disposed so as to face the outer surface of the guide portion 20. Note that FIGS. 3A and 3B schematically illustrate the guide portion 20 and the like and the sizes or the like of the guide portion 20 and the inclined extensible portions 25 are not limited to those illustrated in FIGS. 3A and 3B.

Although illustration is omitted, guide rail portions (not shown) are provided on outer surfaces of the guide portion 20. Likewise, slide portions 29 (FIG. 2) are provided on inner surfaces of the inclined extensible portions 25 facing the outer surfaces. The slide portions 29 are engaged with the guide rail portions in a state of movable in parallel in the guide rail portion along the direction of inclination. The operation of the inclined extensible portions 25 will be described later.

Figure 4:
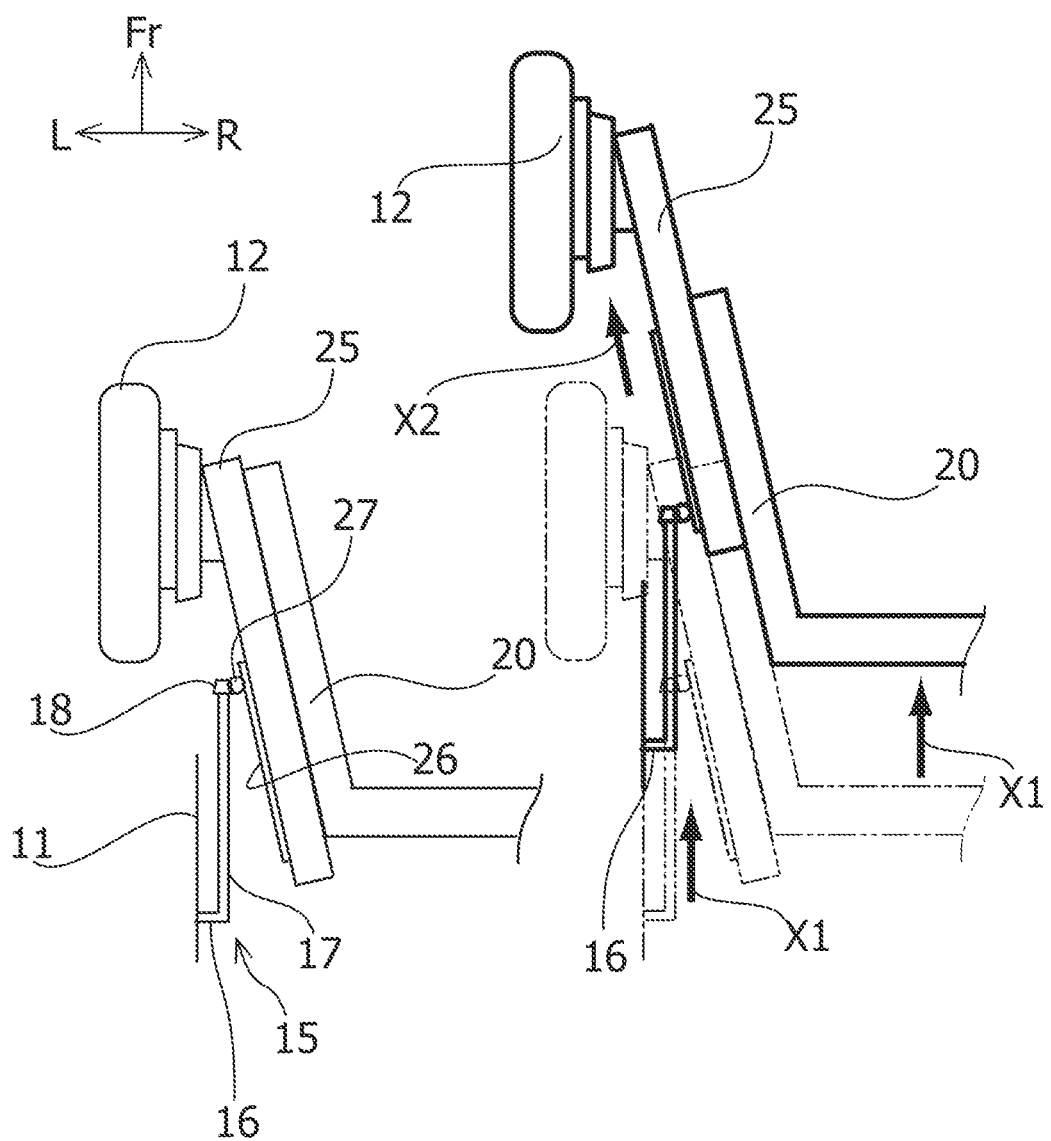
FIG. 4 shows plan views schematically illustrating a positional relationship between a leg part coupling portion of an anterior side member and an inclined extensible portion of a front base, in which a plan view of the contracted state and the plan view including the contracted state in an imaginary line and a plan view including the expanded state in a solid line arranged side-by-side.

Furthermore, rack gear portions 26 configured so as to engage the guide engaging portions 17 of leg part coupling portions 15, described later, are provided on outer surfaces of the inclined extensible portions 25 in this example, and gear mechanisms 27 configured so as to engage the rack gear portions 26 are also provided thereon (FIG. 4). The gear mechanisms 27 each are configured in such a manner that a spur gear portion and a bevel gar portion are integrally rotated about an axis extending in the vehicle up-down direction, although detailed description with illustration is omitted. The spur gear portion engage the rack gear portion 26. The bevel gear portions of the gear mechanisms 27 may be configured so as to be engaged respectively with the bevel gears 18 of the guide engaging portions 17, described later, to configure so-called miter gears.

The anterior side members 11 are provided respectively with the leg part coupling portion 15, to which the lower portions of the leg parts 45 are coupled. As illustrated in FIG. 4, the leg part coupling portion 15 each include a pin portion 16 and a guide engaging portion 17. The pin portion 16 protrudes outward in the vehicle width direction from the anterior side member 11, penetrates through the long hole (base attaching part) 45a provided at the lower portion of the leg part 45. When the leg part 45 pivots forward, the moment of the leg part 45 is transmitted to the pin portion 16, so that the anterior side member 11 moves forward. While the anterior side members 11 moves forward, the pin portion 16 moves in the long hole 45a in the longitudinal direction of the long hole 45a. Note that FIG. 4, in the same manner as FIGS. 3A and 3B, schematically illustrates the guide portion 20 and the like and the sizes or the like of the guide portion 20 and the inclined extensible portions 25 are not limited to those illustrated in FIGS. 3A and 3B. A relationship between the pin portion 16 and the leg part 45 will be described later.

As illustrated in FIG. 4, the guide engaging portion 17 may be configured so as to extend linearly forward from the pin portion 16. A leading end of the guide engaging portion 17 is configured so as to engage the inclined extensible portion 25. In this example, as schematically illustrating in FIG. 4, the bevel gear 18 rotating about the axis extending in the vehicle front-rear direction is provided at the leading end of the guide engaging portion 17. Although description with illustration is omitted, the bevel gear 18 engages the gear mechanism 27 provided on the inclined extensible portion 25. The bevel gear 18 of the guide engaging portion 17 is configured to rotate when the anterior side member 11 and the guide portion 20 move toward the vehicle front, so that the rotational force is transmitted to the gear mechanism 27. A relationship between the guide engaging portion 17 and the inclined extensible portion 25 will be described later.

By the relative movement of the front base 10 and the rear base 30, the moving base 1 can be changed between the expanded state in which the wheel base and the tread width of the front wheels 12 are expanded as illustrated in FIG. 2 and the contracted state in which the wheel base and the tread width are contracted so as to shorten the length of the wheel base and the tread width than the length thereof in the expanded state as illustrated in FIG. 1. Here, the moving base 1 assumes the expanded state in the compact electric vehicle mode and assumes the contracted state in the electric walking aid vehicle mode.

The front base 10 and the rear bases 30 of the moving base 1 are configured so as to be substantially linearly movable in parallel relative to each other in the vehicle front-rear direction. In particular, the difference in length of the wheel base between the expanded state and the contracted state of the moving base 1 is preferably at least half the maximum length of the seat 40 in the seat front-rear direction and not longer than the maximum length of the seat 40.

Subsequently, transformation from the contracted state illustrated in FIG. 1 to the expanded state illustrated in FIG. 2 will be described. In the contracted state, the leading end part 41b of the seating part 41 is located in the vicinity of the front wheels 12, and the seating surface 41a faces the vehicle front. From this state, when the seating part 41 pivots about the pivot shaft 52 provided on the posts 50 and the seating surface 41a moves to a position facing upward, the leg parts 45 pivot about the pivot shaft 52 simultaneously. At this time, the lower portions of the leg part 45 pivot toward the vehicle front about the pivot shaft 52.

Since the long holes 45a of the leg parts 45 and the pin portions 16 of the leg part coupling portions 15 engage each other, when the lower portions of the leg parts 45 pivot toward the vehicle front, the inner wall surfaces of the long holes 45a presses side portions of the pin portions 16 and thus the anterior side members 11 are subjected to a force directed toward the vehicle front. By this force, the anterior side members 11 move in parallel toward the vehicle front with respect to the posterior side members 31. In this example, the anterior side members 11 move in the direction indicated by an arrow X1 in FIG. 4.

In contrast, by the force applied to the pin portions 16, the guide engaging portions 17 press the inclined extensible portions 25 coupled to the guide portions 20. Accordingly, the guide portion 20 moves in parallel toward the vehicle front. By the guide engaging portions 17 pressing the inclined extensible portions 25, the bevel gears 18 provided at the leading edges of the guide engaging portions 17 rotate.

The rotational forces of the bevel gears 18 are transmitted to the bevel gear portion sand the spur gear portions of the gear mechanisms 27 provided on the inclined extensible portions 25. By the rotational forces of the spur gear portions transmitted to the rack gear portions 26, the slide portions 29 of the inclined extensible portions 25 move outward in parallel in the direction of inclination on the guide rail portions. In this example, the slide portions 29 move in the direction indicated by an arrow X2 in FIG. 4. In the present embodiment, the movements of the arrow X1 and the arrow X2 can be performed simultaneously.

With the provision of the mechanisms transmitting the force as in the example described above, the guide portion 20 of the front base 10 can move toward the vehicle front in association with the forward movement of the anterior side members 11. At this time, the front wheels 12 move outward in the vehicle width direction and toward the vehicle front. With the operation described above, the moving base 1 is transformed from the contracted state to the expanded state, the wheel base is expanded from H1 illustrated in FIG. 3A to H2 illustrated in FIG. 3B, and the tread width of the front wheels 12 is expanded from W1 illustrated in FIG. 3A to W2 illustrated in FIG. 3B.

As a consequence, the electric vehicle is transferred from the electric walking aid vehicle mode to the compact electric vehicle mode. It is recommended that the anterior side members 11 and the inclined extensible portions 25 are locked by a locking mechanism, not illustrated, after the completion of the deformation from the contracted state to the expanded state.

Figure 5A:
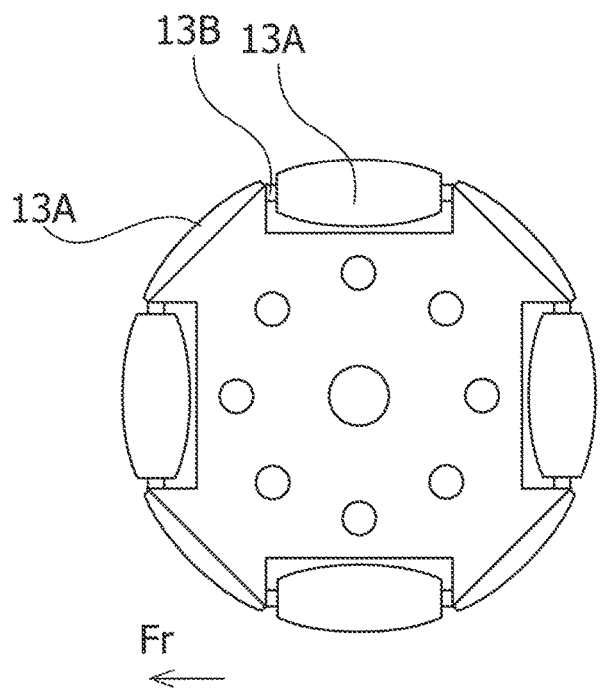
FIG. 5A is a schematic front view of a structure of the front wheels in FIG. 1 viewed from outside in the vehicle width direction.
Figure 5B:
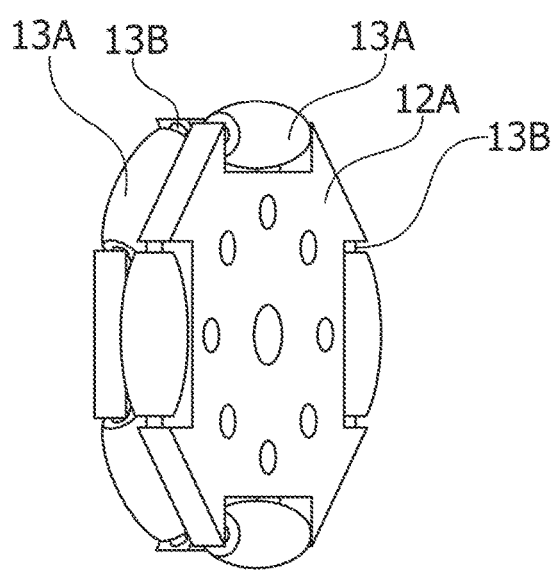
FIG. 5B is a schematic perspective view illustrating the structure of the front wheels in FIG. 1.

The front wheels 12 will now be described. The front wheels 12, rotating in principle about a shaft extending in the vehicle width direction, rotate so as to move in the vehicle front-rear direction. In the present embodiment, each of the front wheels 12 is provided with a plurality of roller parts 13A configured so as to rotate about axes extending orthogonally to the radial direction of the front wheel 12 and also extending in the direction of tangent lines of the outer periphery of the front wheel 12 on the outer periphery of the front wheel 12 as illustrated in FIG. 5A and FIG. 5B. The force in the oblique direction acting between the front wheel 12 and the ground can be released by the roller parts 13A.

The front wheel 12 of this example includes two flat plates 12A having substantially an octagonal shape as illustrated in FIG. 5A and FIG. 5B. Rotary shafts 13B are provided on four sides out of eight sides on an outer periphery of the flat plates 12A so as to extend along the four sides, and the roller parts 13A are provided so as to surround the rotary shafts 13B. The roller parts 13A are capable of rotating coaxially with the rotary shafts 13B. The roller parts 13A and the rotary shafts 13B are disposed equidistantly on the outer peripheral surface of the flat plates 12A. As illustrated in FIG. 5A, the roller parts 13A on one of the flat plates are arranged so as not to overlap on the roller parts 13A on the other flat plate. Likewise, the outer ends of the roller parts 13A in the radial direction of the front wheel 12 is located radially outside of the corresponding outer end of the flat plate 12A. Accordingly, the outer end of the flat plate is prevented from coming into contact with the ground. The front wheel 12 of this example is a so-called omnidirectionally movable wheel.

Regarding the transformation from the expanded state illustrated in FIG. 2 to the contracted state illustrated in FIG. 1 is achieved in the same manner as described above by pivoting the seating part 41 forward, and a leading end part 41b of the seating part 41 forward and downward so that the seating surface 41a faces the vehicle front. At this time, the anterior side members 11 and the guide portion 20 move rearward in parallel. Furthermore, the anterior side members 11 and the guide portion 20 move to the inside of the inclined extensible portions 25. Consequently, the wheel base is contracted from H2 illustrated in FIG. 3B to H1 illustrated in FIG. 3A, and the tread width of the front wheels 12 is contracted from W2 illustrated in FIG. 3B to W1 illustrated in FIG. 3A.

As described above, with the provision of the inclined extensible portions 25 on the front base 10, when the moving base 1 is converted into the expanded state, the tread width of the electric vehicle is expanded, so that stable traveling with a user riding thereon stably supported is achieved. In contrast, when the moving base 1 is converted into the contracted state, since the tread width is reduced, the compact configuration is achieved, and the operation in the zippy manner is achieved.

In addition, the inclined extensible portions 25 of the present embodiment are disposed on the outside of the widthwise side portions of the guide portion 20. However, the invention is not limited thereto. For example, as illustrated in FIG. 6A and FIG. 6B, the inclined extensible portions 25 may be arranged inside of the widthwise side portions of the guide portion 20. In this case, in the electric walking aid vehicle mode, a so-called three-wheel vehicle type having left and right front wheels 12 provided adjacent to each other as one wheel as illustrated in FIG. 6A is also applicable. Accordingly, further compact configuration and the operation in the zippy manner are achieved in the electric walking aid vehicle mode. In contrast, in the compact electric vehicle mode, since the tread width of the front wheels 12 is increased as illustrated in FIG. 6B, more stable traveling than the electric walking aid vehicle mode is achieved.

The description of the present embodiment is provided simply as an example for explaining the invention, and does not limit the invention as claimed in claims. The configurations of the respective parts in the invention is not limited to the embodiment described above, and it may be modified variously within the technical scope of the claims.

In the present embodiment, the inclined extensible portions 25 are configured so as to be extensible by using the gear mechanisms 27. However, the invention is not limited thereto. For example, a link member configured to be extensible may be provided substantially in parallel to the leg parts 45. The inclined extensible portions 25 may be moved in parallel with an electric actuator.

What is claimed is:

1. A mobile object comprising:
a mobile object base including a front base having front wheels disposed at a distance in a width direction and a rear base being located rearward with respect to the front base and including rear wheels;
a seat including a seating part having a seating surface and a leg part configured so as to rotatably support the seating part, and being located above the moving base; and
a movable mechanism configured so as to be capable of moving the front base and the rear base relative to each other in order to make a wheel base provided between the front wheels and the rear wheels expandable and contractible, wherein
the front base is configured so as to be changeable so as to be capable of expanding and contracting a tread width between the front wheels in association with expansion and contraction of the wheel base caused by the movable mechanism,
the seating part is configured so as to turn forward until the seating surface faces forward via the leg parts in association with the relative movement of the front base and the rear base in order to contract the wheel base and the tread width, and
the seating part is configured so as to turn rearward until the seating surface faces upward via the leg part in association with the relative movement of the front base and the rear base in order to expand the wheel base and the tread width.

2. The mobile object according to claim 1, wherein
side portions of the front base in the width direction are configured to incline and spread toward the front,
the leg part is provided at a lower portion of the leg part with a base attaching part configured to allow attachment of the leg part to the front base so as to be pivotable with respect to the front base,
the forward movement of the seating part is achieved by a rearward movement of the base attaching part and a forward pivotal movement of the leg part in association with the rearward movement of the front base for contracting the wheel base and the tread width of the front wheels, and
the rearward movement of the seating part is achieved by a forward movement of the base attaching part and a rearward pivotal movement of the leg part in association with the forward movement of the front base for expanding the wheel base and the tread width of the front wheels.

3. The mobile object according to claim 2, wherein the front base is provided at a widthwise side portion thereof with an extensible portion extensible in a direction of inclination inclined outward in the width direction as the extensible portion goes toward the vehicle front, and the front wheels are attached to outer front portions of the extensible portion.

4. The mobile object according to claim 1, wherein the front wheels are omnidirectionally movable wheels.

* * * * *